United States Patent
Jin et al.

(10) Patent No.: US 12,107,502 B2
(45) Date of Patent: Oct. 1, 2024

(54) VOLTAGE CONVERTER, AN ELECTRIFIED VEHICLE AND A METHOD FOR REAL-TIMELY DETECTING A VOLTAGE CONVERTER

(71) Applicant: VALEO SYSTEMES DE CONTROLE MOTEUR, Cergy Pontoise (FR)

(72) Inventors: Qiong Jin, Shanghai (CN); Hanyu Jin, Shanghai (CN); Min Yang, Shanghai (CN)

(73) Assignee: VALEO SYSTEMES DE CONTROLE MOTEUR, Cergy Pontoise (FR)

( * ) Notice: Subject to any disclaimer, the term of this patent is extended or adjusted under 35 U.S.C. 154(b) by 13 days.

(21) Appl. No.: 18/145,166

(22) Filed: Dec. 22, 2022

(65) Prior Publication Data

US 2023/0198408 A1    Jun. 22, 2023

(30) Foreign Application Priority Data

Dec. 22, 2021    (CN) .......................... 202111584978.3

(51) Int. Cl.
*H02M 3/158*    (2006.01)
*B60L 53/22*    (2019.01)
*H02H 7/12*    (2006.01)

(52) U.S. Cl.
CPC .......... *H02M 3/1582* (2013.01); *B60L 53/22* (2019.02); *H02H 7/1213* (2013.01); *B60L 2210/12* (2013.01); *B60L 2210/14* (2013.01)

(58) Field of Classification Search
CPC .. H02M 3/1582; B60L 53/22; B60L 2210/12; B60L 2210/14; H02H 7/1213
See application file for complete search history.

(56) References Cited

U.S. PATENT DOCUMENTS

| 11,757,364 B2 * | 9/2023 | Shim ................. H02M 3/33584 307/82 |
| 2018/0287494 A1 | 10/2018 | Yano et al. |
| 2018/0287500 A1 | 10/2018 | Tsutsui et al. |

FOREIGN PATENT DOCUMENTS

| CN | 205829235 U | 12/2016 |
| CN | 107431432 A | 12/2017 |

(Continued)

OTHER PUBLICATIONS

Extended European Search Report issued on Apr. 25, 2023 in European Patent Application No. 22214350.5, 11 pages.

*Primary Examiner* — Carlos Amaya
(74) *Attorney, Agent, or Firm* — Oblon, McClelland, Maier & Neustadt, L.L.P.

(57) ABSTRACT

A voltage converter for an electrified vehicle is connected between an external low-voltage source and an external high-voltage source. The voltage converter includes a power conversion device having at least two power conversion components connected in parallel. The voltage converter further includes a safety power switching device, connected to the power conversion device and comprising at least two safety power switching components, configured for providing a protection mechanism for the voltage converter in an OFF or ON selection process thereof. Also included is a safety detection controller, connected to each of the safety power switching components, configured for real-time detection of each of the safety power switching components. A real-time detecting method for the voltage converter may be used in an electrified vehicle.

16 Claims, 4 Drawing Sheets

(56) References Cited

FOREIGN PATENT DOCUMENTS

| | | |
|---|---|---|
| CN | 108696123 A | 10/2018 |
| CN | 113196605 A | 7/2021 |
| DE | 10 2018 206 269 A1 | 6/2019 |
| EP | 2 978 116 A1 | 1/2016 |
| FR | 3 090 226 A1 | 6/2020 |
| WO | WO 2017/073828 A1 | 5/2017 |
| WO | WO 2017/073829 A1 | 5/2017 |
| WO | WO 2020/127333 A1 | 6/2020 |
| WO | WO 2021/197380 A1 | 10/2021 |

* cited by examiner

VOLTAGE CONVERTER, AN ELECTRIFIED VEHICLE AND A METHOD FOR REAL-TIMELY DETECTING A VOLTAGE CONVERTER

TECHNICAL FIELD

Embodiments of the present disclosure relate generally to a voltage converter, an electrified vehicle and a real-time detection method for a voltage converter of an electrified vehicle.

BACKGROUND OF THE INVENTION

As drive control technology develops, it is playing an ever more important role in fields such as motor control, electrified vehicle control and frequency conversion control. In the field of electrified vehicles, which include for example pure electric vehicles (BEV, battery electric vehicles), hybrid electric vehicles (HEV), plug-in hybrid electric vehicles (PHEV), extended-range electric vehicles (range extended expansion valve) and fuel cell electric vehicles (FCEV), etc., there is already technology which uses a DC/DC (direct current to direct current) converter in a dual-power-supply network vehicle architecture, in order to perform voltage conversion between a first network and a second network of a vehicle. Generally, the first network is a low-voltage network supplying less than 30 volts (V), for example 24 V, 14 V or 12 V, while the second network is a high-voltage network supplying more than 30 V, for example 48 V or 60 V. The operation of performing voltage conversion specifically comprises connecting the high-voltage side of the DC/DC converter to an iBSG (integrated belt starter generator) in the vehicle, and connecting it to a 48 V or 60 V battery for example via a relay. A capacitor at the high-voltage side needs to be charged to a battery voltage of 48 V or 60 V for example by means of a pre-charging mechanism of the DC/DC converter; the electrified vehicle then connects the closed relay to the high-voltage side with a 48 V or 60 V battery for example, the battery then supplies power to the iBSG, the iBSG operates in starter mode, then the iBSG operates in generator mode, driven by the internal combustion engine, and the electrified vehicle commands the DC/DC converter to run in a buck mode to realize power supply switching.

Therefore, it would be desirable if any improvements on effective testing of a switch-off path for a safety switch of a voltage converter of an electrified vehicle, at least using a high-efficiency, low-cost and simple structure and method.

SUMMARY OF THE INVENTION

Aspects and advantages of the invention will be set forth in part in the following description, or may be obvious from the description, or may be learned through practice of the invention.

In accordance with one aspect disclosed herein, a voltage converter for an electrified vehicle is provided. The voltage converter is connected between an external low-voltage source and an external high-voltage source. The voltage converter comprises a power conversion device comprising at least two power conversion components connected in parallel. The voltage converter further comprises a safety power switching device, connected to the power conversion device and comprising at least two safety power switching components, configured for providing a protection mechanism for the voltage converter in an turning-off or turning-on selection process thereof; and the voltage converter further comprises a safety detection controller, connected to each of the safety power switching components, configured for real-time detection for each of the safety power switching components.

In some embodiments, each of the safety power switching components is in correspondence with each of the power conversion components respectively, and a series connection is formed between each of the safety power switching components and the corresponding power conversion components.

In some embodiments, each of the safety power switching components comprises two power switches connected in a reverse-series manner for operating in a boost mode and a buck mode respectively, the two power switches are configured for providing a protection mechanism for the power conversion device in the boost mode and buck mode respectively.

In some embodiments, the safety detection controller comprises a receiver configured for receiving in real time a first detection voltage between each of the power conversion components and the safety power switching components connected in series therewith, and a second detection voltage between the two power switches connected in a reverse-series manner.

In some embodiments, the safety detection controller further comprises a comparator configured for setting predetermined voltage values of different stages of a pre-charging mode, and comparing in real time the received first detection voltage and second detection voltage to determine whether they reach the corresponding predetermined voltage values.

In some embodiments, the safety detection controller further comprises an outputter configured for outputting an error signal to indicate that the corresponding safety power switch is in an abnormal operating state when the first detection voltage or second detection voltage received in real time does not reach the corresponding predetermined voltage value.

In some embodiments, the predetermined voltage values comprise a first predetermined voltage value for a first pre-charging stage: the value of the first detection voltage and the value of the second detection voltage shall be zero during the first pre-charging stage; and the value of the first detection voltage shall be equal to or close to the first predetermined voltage value and the value of the second detection voltage shall be zero after the end of the first pre-charging stage.

In some embodiments, the predetermined voltage values further comprise a second predetermined voltage value for a second pre-charging stage: the value of the second detection voltage shall reach the second predetermined voltage value from zero at the beginning of the second pre-charging stage; the value of the first detection voltage shall be a varying value which keeps rising during the second pre-charging stage; and the value of the second detection voltage shall return to zero after the end of the second pre-charging stage.

In another exemplary aspect, the present invention provides an electrified vehicle having the voltage converter described above.

In another exemplary aspect of the present disclosure, a method for real-timely detecting a voltage converter of an electrified vehicle is provided. The method comprises: in each stage of a pre-charging mode of the voltage converter, detecting in real time a first detection voltage value between a power conversion device and a safety power switching device connected thereto, and a second detection voltage value between two power switches, connected in a reverse series manner, provided with the safety power switching device; setting predetermined voltage values of different stages of the pre-charging mode, and comparing the first and second detection voltage values detected in real time to determine whether they reach the corresponding predetermined voltage values; and determining whether the safety power switching device is in a normal operating state upon the comparison results.

In some embodiments, the method further comprises: during a first pre-charging stage, if the first and second detection voltage values are both zero, indicating the safety power switching device is turn-off, it is determined that the power switching device is in a normal operating state; and afer the end of the first pre-charging stage, if the first detection voltage value is equal to or close to the predetermined voltage value of the first pre-charging stage and the second detection voltage value is zero, indicating the safety power switching device is turn-off, it is determined that the power switching device is in a normal operating state.

In some embodiments, the method further comprises: during a second pre-charging stage, if the first detection voltage value is a varying value which keeps rising and the second detection voltage value is equal to or close to the predetermined voltage value of the second pre-charging stage, indicating the safety power switching device is turn-on it is determined that the safety power switching device is in a normal operating state; and after the end of the second pre-charging stage, if the second detection voltage value returns to zero, the safety power switching device is turn-off, it is determined that the safety power switching device is in a normal operating state.

In some embodiments, the method further comprises: outputting a detection signal based on the comparison results; if the first detection voltage value or second detection voltage value detected in real time does not reach the corresponding predetermined voltage value, an error signal will be outputted to indicate that the corresponding safety power switching device is in an abnormal operating state.

With reference to the following description, these and other features, aspects and advantages of the present disclosure will become easier to understand. The accompanying drawings incorporated in this specification and constituting a part thereof illustrate embodiments of the present application, and are used to explain the principles of the present disclosure together with said description.

BRIEF DESCRIPTION OF THE DRAWINGS

The complete and enlightening disclosed content of the present application, including preferred embodiments thereof, is expounded herein for those skilled in the art. This specification refers to the drawings, in which.

DETAILED DESCRIPTION OF THE INVENTION

Specific embodiments of the present invention are described in detail below in conjunction with the accompanying drawings. In the following detailed description of these specific embodiments, some well-known functions or structures are not described in detail in this specification to avoid unnecessary details which would affect the disclosure of the present invention. Each embodiment is provided for the purpose of explaining the present application, without limiting the present application. In fact, it will be apparent to those skilled in the art that various modifications and variations may be made in the present disclosure without departing from the scope or spirit of the present application. For example, features illustrated or described as part of one embodiment can be used with another embodiment to yield a further embodiment. Therefore, it is intended that the present disclosure cover such modifications and variations that fall within the scope of the appended claims and their equivalents.

As used herein, the terms "first", "second" and similar terms are used interchangeably to distinguish one element from another, rather than being intended to denote the position or importance of each element. As used herein, the terms "a", "an", "the" and "said" are intended to indicate the presence of one or more elements, unless otherwise clearly stated in the context. The terms "include", "comprise", and "have" are intended to be inclusive and mean that there may be other elements in addition to the element listed. The terms "connection" or "connected" and similar terms are not limited to a physical or mechanical connection, and may include an electrical connection, whether direct or indirect.

In addition, as used herein, the term "real-time" means that the times when associated events occur, the times when predetermined data is measured and collected, and the data processing times and systems correspond to at least one of the event and environment times. In the embodiments described herein, these times essentially occur instantaneously.

Figure 1:
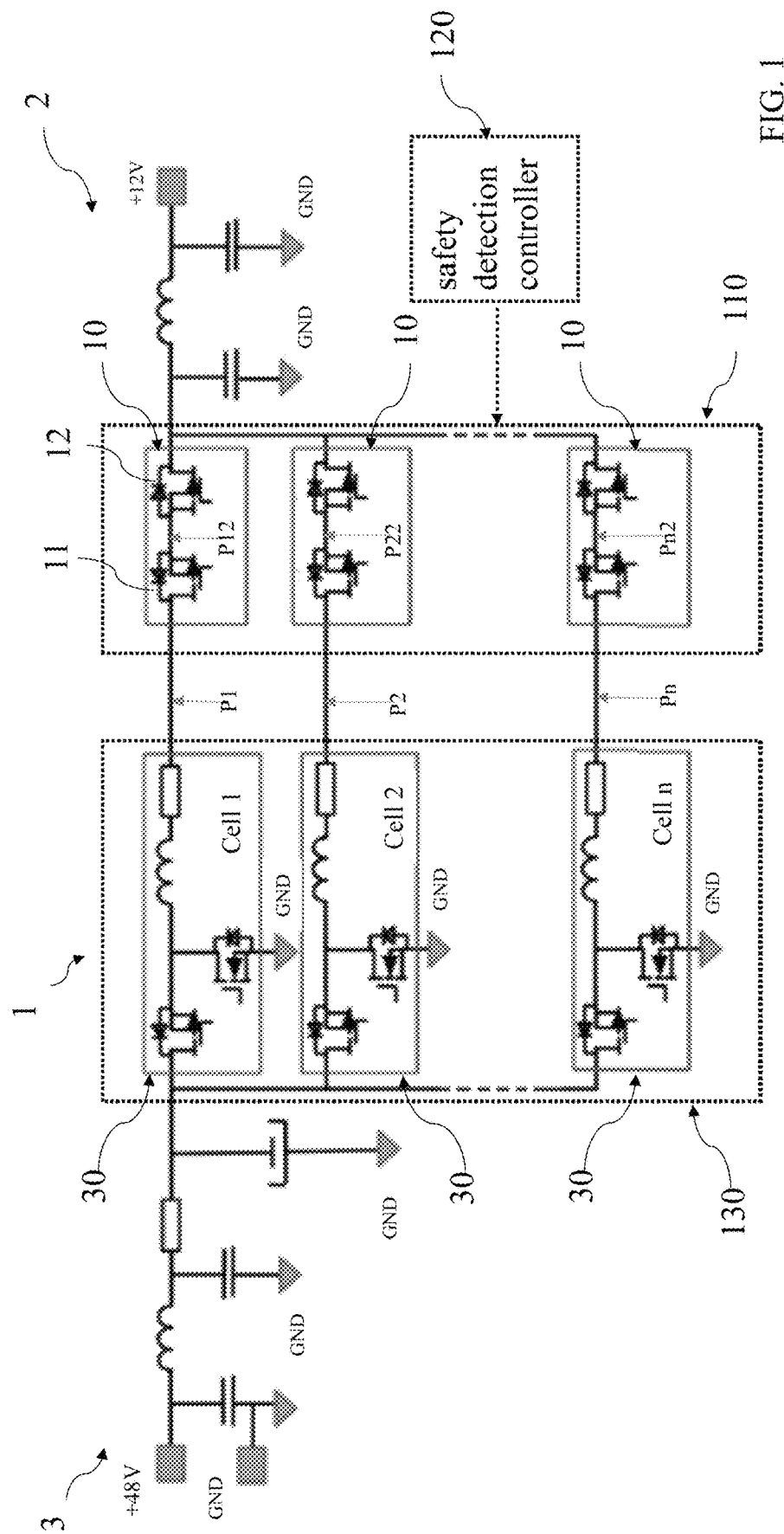
FIG. 1 is a schematic circuit diagram of a voltage converter according to an exemplary embodiment of the present disclosure.
Figure 2:
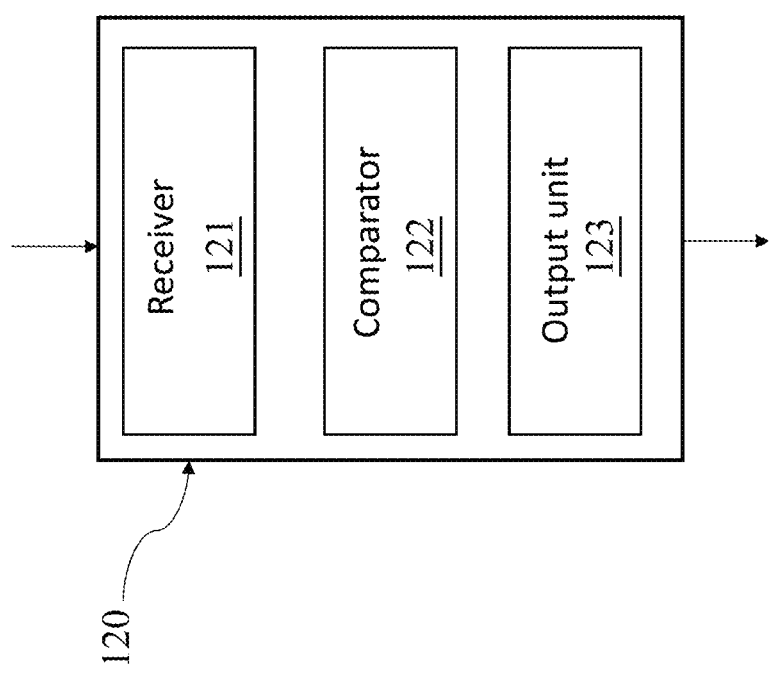
FIG. 2 is a structural schematic diagram of a safety detection controller according to an exemplary embodiment of the present disclosure.

Referring to the drawings, wherein identical numerals indicate identical elements in all of the drawings, FIG. 1 illustrates a circuit diagram of a DC/DC converter in an exemplary embodiment of the present disclosure, and FIG. 2 illustrates a structural schematic diagram of a safety detection controller in an exemplary embodiment. In the embodiment shown in FIG. 1, a DC/DC converter 1 may be implemented in an electrified vehicle equipped with a dual-voltage power supply network. A first on-board network may comprise a low-voltage source 2 of 12 V for example, and a second on-board network may comprise a high-voltage source 3 of 48 V for example. The low-voltage source 2 and high-voltage source 3 have the same electrical ground as a reference, and the DC/DC converter 1 is connected between the low-voltage source 2 and high-voltage source 3. In the illustrated embodiment, the DC/DC converter 1 can operate in a first pre-charging stage and a second pre-charging stage, thereby realizing pre-charging of predetermined voltage values. When the DC/DC converter 1 operates in the first pre-charging stage, a high-voltage side voltage value will be from 0 V to a first predetermined voltage value, e.g. a 12 V battery voltage. When the DC/DC converter 1 operates in the second pre-charging stage, the high-voltage side voltage value will be from the first predetermined voltage value to a second predetermined voltage value, e.g. from 12 V to a 48 V battery voltage.

Continuing to refer to FIG. 1, in this embodiment, the DC/DC converter 1 comprises a power conversion device 130, the power conversion device 130 comprising multiple power conversion components 30 connected in parallel. The DC/DC converter 1 further comprises a safety power switching device 110, the safety power switching device 110 comprising multiple safety power switching components 10, configured for providing a protection mechanism for the DC/DC converter 1 in the turning-off or turning-on selection process thereof. The safety power switching components 10 are in one-to-one correspondence with the power conversion components 30, and a series connection is formed between each of the safety power switching components 10 and power conversion components 30 in one-to-one correspondence with each other. Each of the safety power switching components 10 comprises two reverse-series-connected power switches 11, 12 to operate in a boost mode and a buck mode respectively, and is thereby used for providing a protection mechanism for the power conversion device 130 in the boost mode and buck mode respectively.

In some embodiments, the power switches 11, 12 include but are not limited to MOSFETs, insulated gate bipolar transistors (IGBT), integrated gate commutated thyristors (IGCT), injection enhanced gate transistors (IEGT), silicon carbide metal oxide semiconductor field effect transistors (SiC MOSFET), or other controllable electric switches capable of switching in ON and OFF states. As in the embodiment shown, the power switches 11, 12 may be MOSFETs.

Still refering to FIG. 1, in this embodiment, the DC/DC converter 1 further comprises a safety detection controller 120. The safety detection controller 120 is connected to each safety power switch component 10, for subjecting each safety power switching component 10 to real-time detection, in particular testing a switch-off path of the safety power switch in the present ignition cycle, in order to detect whether there is a fault in the safety power switch, and thereby ensure that it can operate normally in each ignition cycle.

Referring to FIG. 2, the safety detection controller 120 may comprise a receiver 121, a comparator 122 and an outputter 123. The receiver 121 is used to receive in real time a first detection voltage P1, P2 . . . Pn between each power conversion component 30 and the safety power switching component 10 connected in series therewith, and a second detection voltage P12, P22 . . . Pn2 between the two reverse-series-connected power switches 11, 12 of each safety power switching component 10; the comparator 122 is used to set predetermined voltage values of different stages of a pre-charging mode, and compare in real time the received first detection voltages P1, P2 . . . Pn and second detection voltages P12, P22 . . . Pn2 to determine whether they have reached the corresponding predetermined voltage values; and the outputter 123 is used to output an error signal to indicate that the corresponding safety power switches 11, 12 are in an abnormal operating state when the first detection voltages or second detection voltages received in real time are not in agreement with the corresponding predetermined voltage values.

Specifically, if the safety power switches 11, 12 are in a normal operating state, then the values of the first detection voltages P1, P2 . . . Pn and the values of the second detection voltages P12, P22 . . . Pn2 should all be zero during the first pre-charging stage; and after the end of the first pre-charging stage, the values of the first detection voltages P1, P2 . . . Pn should be equal to or close to the first predetermined voltage value while the values of the second detection voltages P12, P22 . . . Pn2 should be zero.

When the second pre-charging stage begins, the values of the second detection voltages P12, P22 . . . Pn2 should reach the second predetermined voltage value from zero; during the second pre-charging stage, the values of the first detection voltages P1, P2 . . . Pn should be changing values which are steadily rising; and after the end of the second pre-charging stage, the values of the second detection voltages P12, P22 . . . Pn2 should return to zero.

Figure 3:
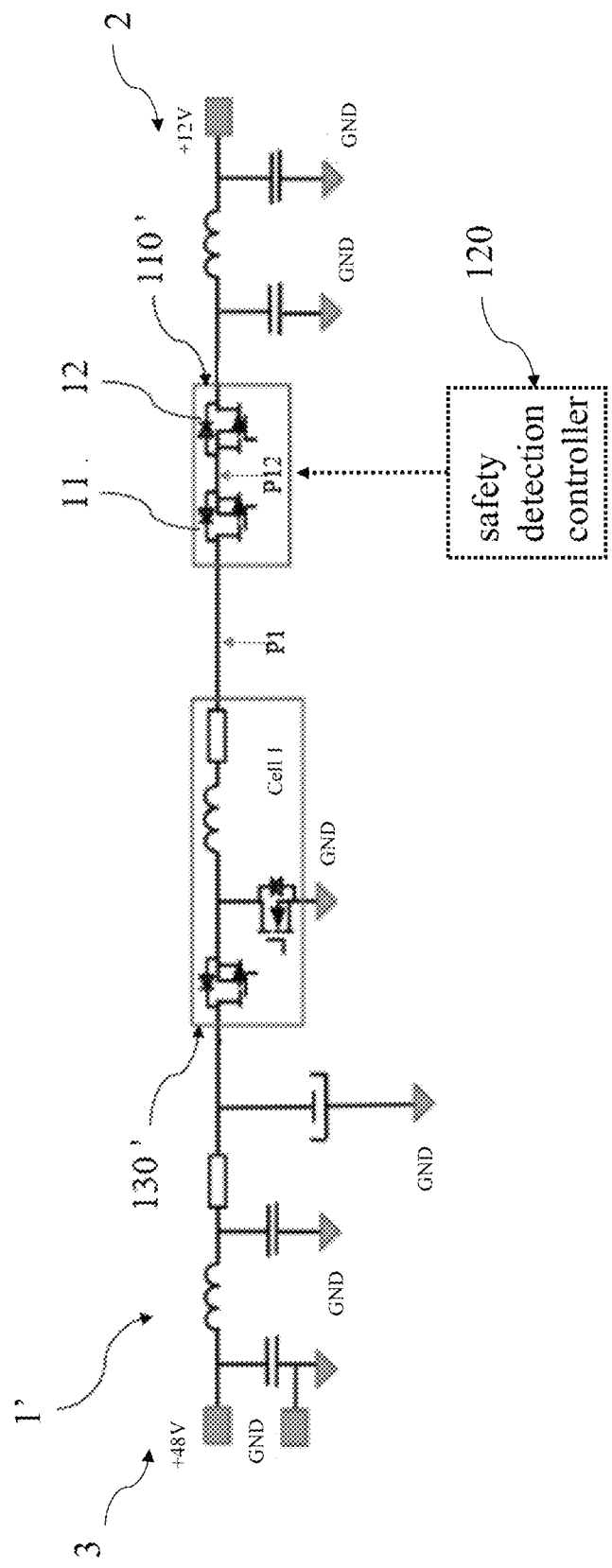
FIG. 3 is a schematic circuit diagram of a voltage converter according to another exemplary embodiment of the present disclosure.

Referring to FIG. 3, showing a schematic circuit diagram of a voltage converter according to another exemplary embodiment of the present disclosure. The DC/DC converter 1' shown in FIG. 3 and the DC/DC converter 1 shown in FIG. 1 differ in that the power conversion device 130' of the DC/DC converter 1' shown in FIG. 3 comprises only one power conversion component in the DC/DC converter 1 shown in FIG. 1, and the safety power switching device 110' of the DC/DC converter 1' comprises only one safety power switching component in the DC/DC converter 1 shown in FIG. 1, i.e. has only two reverse-series-connected power switches 11, 12; the safety detection controller 120 is connected to the two power switches 11, 12, for subjecting the two power switches 11, 12 to real-time detection. Specifically, a first detection voltage P1 is set between the power conversion device 130' and the safety power switch connected thereto, and a second detection voltage P12 is set between the two reverse-series-connected power switches 11, 12. During the first pre-charging stage, the values of the first and second detection voltages P1, P12 should both be zero; after the end of the first pre-charging stage, the value of the first detection voltage P1 should be equal to or close to the first predetermined voltage value and the value of the second detection voltage P12 should be zero. When the second pre-charging stage begins, the value of the second detection voltage should reach the second predetermined voltage value from zero; during the second pre-charging stage, the value P1 of the first detection voltage is a changing value which is steadily rising; and after the end of the second pre-charging stage, the value of the second detection voltage P12 should return to zero.

Figure 4:
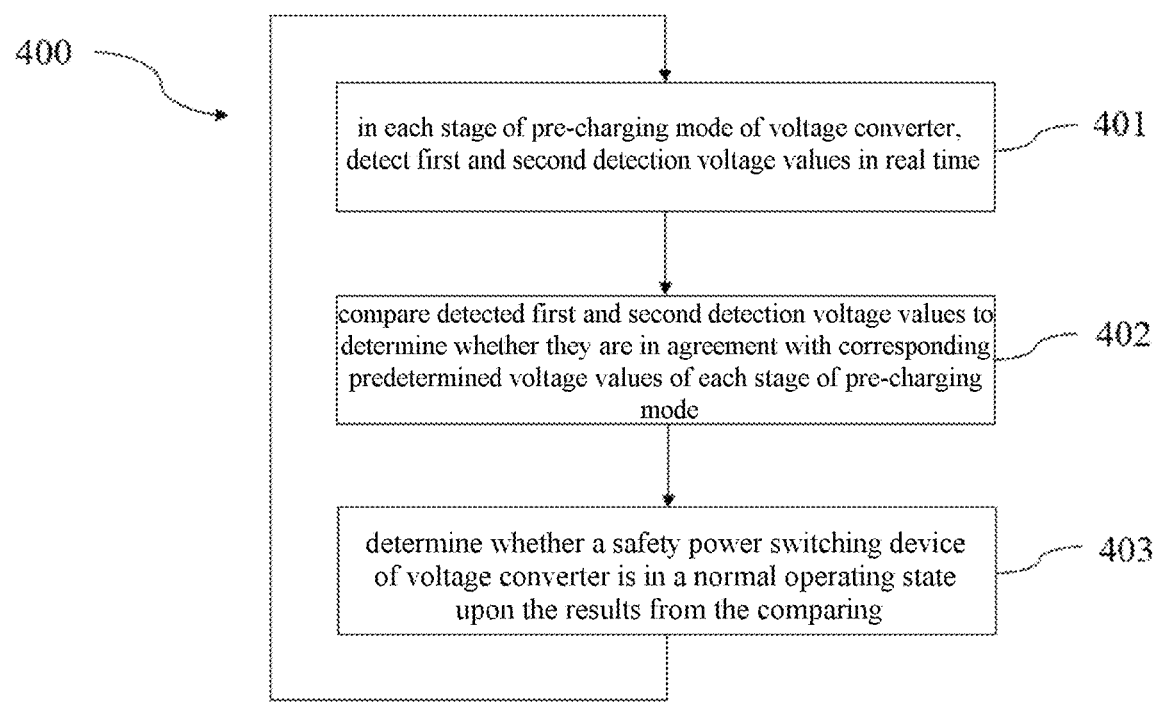
FIG. 4 is a schematic flow chart of a safety detection method according to an exemplary embodiment of the present disclosure.

As shown in FIG. 4, an exemplary safety detection method 400 is applied to the voltage converters shown in FIGS. 1 and 3. The exemplary safety detection method 400 comprises the following steps:

Step 401: in each stage of the pre-charging mode of the voltage converter, detecting in real time the first detection voltage value between the power conversion device and the safety power switching device connected thereto, and the second detection voltage value between the two reverse-series-connected power switches of the safety power switching device.

Step 402: setting the predetermined voltage values of the different stages of the pre-charging mode, and comparing the first and second detection voltage values detected in real time to determine whether they are in agreement with the corresponding predetermined voltage values.

Step 403: based on the comparison results, determining whether the safety power switching device is in a normal operating state.

Specifically, during the first pre-charging stage, if the first and second detection voltage values are both zero, then the safety power switching device is in a turning-off state, i.e. in a normal operating state; and when the first pre-charging stage has ended, if the first detection voltage value is equal to or close to the predetermined voltage value of the first pre-charging stage and the second detection voltage value is zero, then the safety power switch apparatus is in a turning-off state, i.e. in a normal operating state.

During the second pre-charging stage, if the first detection voltage value is a varying value that is steadily rising and the second detection voltage value is equal to or close to the predetermined voltage value of the second pre-charging stage, then the safety power switching device is in a turning-on state, i.e. in a normal operating state; and after the end of the second pre-charging stage, if the second detection voltage value has returned to zero, then the safety power switching device is in a turning-off state, i.e. in a normal operating state.

A detection signal is outputted based on the comparison results; if the first detection voltage value or second detection voltage value detected in real time is not in agreement with the corresponding predetermined voltage value, then an error signal will be outputted to indicate that the corresponding safety power switch component is in an abnormal operating state.

It is understood that in some embodiments, the first and second detection voltage values may be continuously monitored and read by means of a controller. The controller may be any type of programmable device, such as a controller, a controller unit (MCU) or a digital signal processor (DSP), etc.

Through the voltage converter provided in the present disclosure and the real-time detection method thereof, the DC/DC converter's own existing controller may be used for testing the safety switch, making it possible to detect whether the safety switch has a fault during power-up, with no need for additional testing software and steps to be added, and no need for additional costs, and it is possible to ensure that the safety switch can operate normally in each ignition cycle, thereby increasing the coverage of safety switch diagnostics.

This specification discloses the present disclosure by using embodiments, including preferred embodiments, and also enables those skilled in the art to implement the present application, including making and using any apparatus or system and performing any incorporated method. The patentable scope of the present disclosure s defined by the claims, and may include other embodiments conceived by those skilled in the art. Such other examples shall be within the scope of the claims if they include structural elements that do not differ from the literal language of the claims, or if they include equivalent structural elements with no substantial differences from the literal language of the claims.

What is claimed is:

1. A voltage converter for an electrified vehicle, connected between an external low-voltage source and an external high-voltage source, the voltage converter comprising:
   a power conversion device comprising at least two power conversion components connected in parallel;
   a safety power switching device, connected to the power conversion apparatus and comprising at least two safety power switching components, configured for providing a protection mechanism for the voltage converter in a turning-off or turning-on selection process thereof; and
   a safety detection controller, connected to each of the safety power switching components, configured for real-time detection of each of the safety power switching components, wherein:
   each of the safety power switching components is in correspondence with each of the power conversion components respectively, and a series connection is formed between each of the safety power switching components and the corresponding power conversion components;
   each of the safety power switching components comprises two power switches connected in a reverse-series manner for operating in a boost mode and a buck mode respectively, the two power switches are configured for providing a protection mechanism for the power conversion device in the boost mode and buck mode respectively; and
   the safety detection controller comprises:
      a receiver, configured for receiving in real time a first detection voltage between each of the power conversion components and the safety power switching components connected in series therewith and a second detection voltage between the two power switches connected in a reverse-series manner;
      a comparator, configured for setting predetermined voltage values of different stages of a pre-charging mode, and comparing in real time the received first detection voltage and second detection voltage to determine whether they reach the corresponding predetermined voltage values; and
      an outputter, configured for outputting an error signal to indicate that the corresponding safety power switch is in an abnormal operating state when the first detection voltage or second detection voltage received in real time does not reach the corresponding predetermined voltage value.

2. The voltage converter according to claim 1, wherein:
   the predetermined voltage values comprise a first predetermined voltage value for a first pre-charging stage:
      the value of the first detection voltage and the value of the second detection voltage shall be zero during the first pre-charging stage; and
      the value of the first detection voltage shall be equal to or close to the first predetermined voltage value and the value of the second detection voltage shall be zero after the end of the first pre-charging stage.

3. The voltage converter according to claim 2, wherein:
   the predetermined voltage values further comprise a second predetermined voltage value for a second pre-charging stage:
      the value of the second detection voltage shall reach the second predetermined voltage value from zero at the beginning of the second pre-charging stage;
      the value of the first detection voltage shall be a varying value which keeps rising during the second pre-charging stage; and
      the value of the second detection voltage shall return to zero after the end of the second pre-charging stage.

4. An electrified vehicle, comprising the voltage converter according to claim 3.

5. An electrified vehicle, comprising the voltage converter according to claim 2.

6. An electrified vehicle, comprising the voltage converter according to claim 1.

7. A voltage converter for an electrified vehicle, connected between an external low-voltage source and an external high-voltage source, the voltage converter comprising:
   a power conversion device;
   a safety power switching device, connected to the power conversion device and comprising two power switches connected in a reverse-series manner to provide a protection mechanism for the voltage converter in a turning-off or turning-on selection process thereof respectively; and a safety detection controller, connected to each of the power switches, configured for real-time detection of each of the power switches, wherein the safety detection controller comprises:
- a receiver, configured for receiving in real time a first detection voltage between the power conversion device and the safety power switching device connected thereto, and a second detection voltage between the two power switches connected in a r reverse-series manner;
- a comparator, configured for setting predetermined voltage values of different stages of a pre-charging mode, and for comparing in real time the received first detection voltage and second detection voltage to determine whether they reach the corresponding predetermined voltage values; and
- an outputter, configured for outputting a detection signal according to the comparison results, outputting an error signal to indicate that the corresponding safety power switch is in an abnormal operating state if the first detection voltage or second detection voltage received in real time does not reach the corresponding predetermined voltage value.

8. The voltage converter according to claim 7, wherein:
the predetermined voltage values comprise a first predetermined voltage value for a first pre-charging stage:
the values of the first and second detection voltages shall both be zero during the first pre-charging stage;
the value of the first detection voltage shall be equal to or close to the first predetermined voltage value and the value of the second detection voltage shall be zero after the end of the first pre-charging stage.

9. The voltage converter according to claim 8, wherein:
the predetermined voltage values further comprise a second predetermined voltage value for a second pre-charging stage:
the value of the second detection voltage shall reach the second predetermined voltage value from zero at the beginning of a second pre-charging stage;
the value of the first detection voltage is a varying value which keeps rising during the second pre-charging stage; and
the value of the second detection voltage shall be zero after the end of the second pre-charging stage.

10. An electrified vehicle, comprising the voltage converter according to claim 9.

11. An electrified vehicle, comprising the voltage converter according to claim 8.

12. An electrified vehicle, comprising the voltage converter according to claim 7.

13. A method for real-timely detecting a voltage converter of an electrified vehicle, comprising:
in each stage of a pre-charging mode of the voltage converter, detecting in real time a first detection voltage value between a power conversion device and a safety power switching device connected thereto, and a second detection voltage value between two power switches, connected in a reverse series manner, provided with the safety power switching device;
setting predetermined voltage values of different stages of the pre-charging mode, and comparing the first and second detection voltage values detected in real time to determine whether they reach the corresponding predetermined voltage values; and
determining whether the safety power switching device is in a normal operating state upon the comparison results.

14. The method according to claim 13, further comprising:
during a first pre-charging stage, if the first and second detection voltage values are both zero, indicating the safety power switching device is turn-off, it is determined that the power switching device is in a normal operating state; and
after the end of the first pre-charging stage, if the first detection voltage value is equal to or close to the predetermined voltage value of the first pre-charging stage and the second detection voltage value is zero, indicating the safety power switching device is turn-off, it is determined that the power switching device is in a normal operating state.

15. The method according to claim 14, further comprising:
during a second pre-charging stage, if the first detection voltage value is a varying value which keeps rising and the second detection voltage value is equal to or close to the predetermined voltage value of the second pre-charging stage, indicating the safety power switching device is turn-on it is determined that the safety power switching device is in a normal operating state; and
after the end of the second pre-charging stage, if the second detection voltage value returns to zero, the safety power switching device is turn-off, it is determined that the safety power switching device is in a normal operating state.

16. The method according to claim 13, further comprising:
outputting a detection signal based on the comparison results; if the first detection voltage value or second detection voltage value detected in real time does not reach the corresponding predetermined voltage value, an error signal will be outputted to indicate that the corresponding safety power switching device is in an abnormal operating state.

* * * * *